Sept. 16, 1958     C. S. DAYTON     2,851,909
TRANSMISSION FOR WASHING MACHINES OR THE LIKE
Filed Nov. 22, 1955
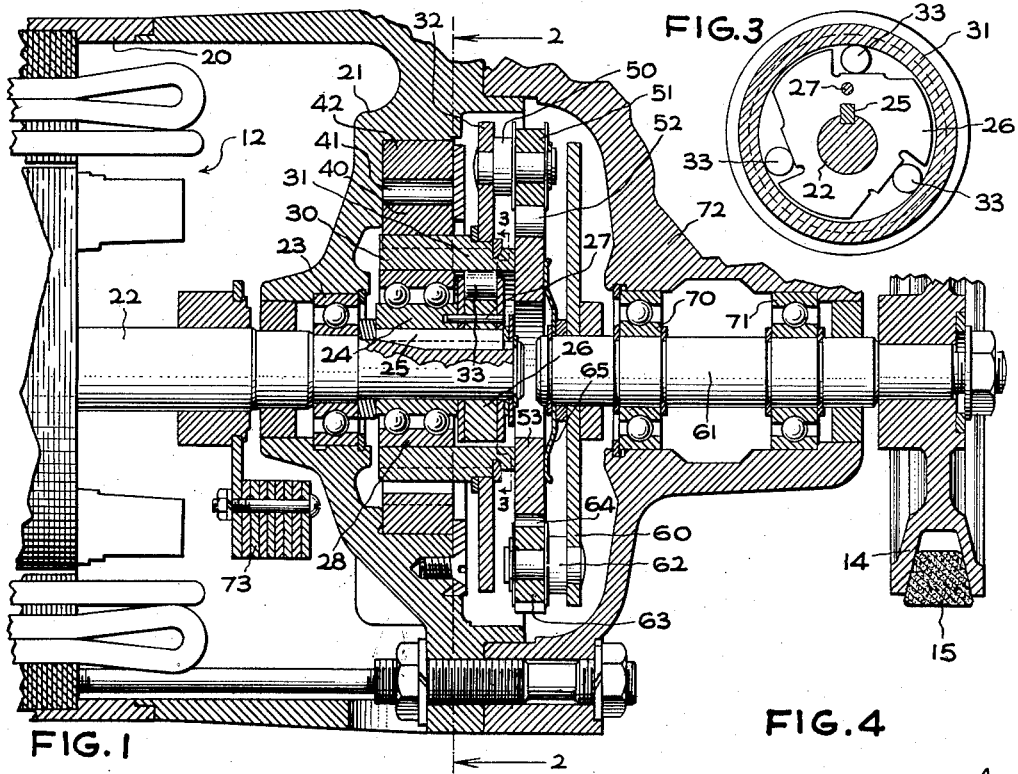
FIG. 1
FIG. 3
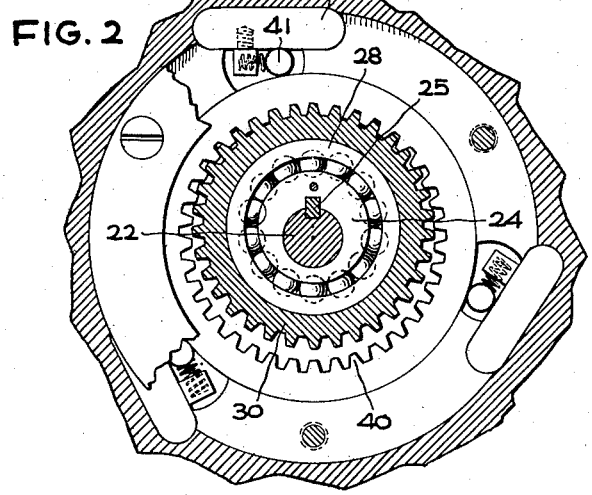
FIG. 2
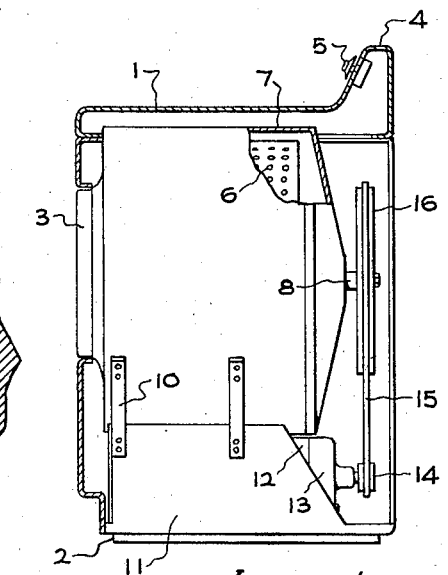
FIG. 4
Inventor
Carl S. Dayton
by Harry F. Manbeck, Jr.
His Attorney United States Patent Office 2,851,909
Patented Sept. 16, 1958

2,851,909

TRANSMISSION FOR WASHING MACHINES OR THE LIKE

Carl S. Dayton, Peabody, Mass., assignor to General Electric Company, a corporation of New York Application November 22, 1955, Serial No. 548,298

8 Claims. (Cl. 74—810)

This invention relates to an improved transmission suitable for driving an output shaft in a single direction, at either of two selected speeds, by means of an input shaft which is driven in reverse directions at a single speed, one direction of rotation thereof effecting one output shaft speed and the other direction effecting the other output shaft speed. In particular, I have directed my invention to a transmission to be employed in the driving mechanism of clothes washing machines of the type using a single rotating receptacle within which the clothes are washed and then dried by centrifugal extraction. Although the invention is intended for general use other than with washing machines, I have chosen to describe the operation with an automatic domestic washing machine of known type because of the special need in this usage for a compact simplified transmisison which does not require solenoids, latches and the like for the purpose of shifting gears.

When an automatic washing machine of the rotating basket type proceeds from a washing or rinsing step at a lower speed into a centrifugal extraction step at a higher speed, it is desirable that the clothes should not have an opportunity to collect in one place within the basket. Such collection creates an unbalance condition and causes undesirable vibration of the rotating parts. Accordingly, it is important, particularly in machines having baskets mounted on a nonvertical axis, that the basket continue to rotate at approximately its tumble-wash speed while the transmisison shifts to the spin extraction speed. Concomitantly, the basket should continue to rotate in the same direction for both the tumble-wash and spin-extraction operations.

An object of my invention is to provide an improved transmission capable of driving an output shaft in a single direction by means of an input shaft selectively drivable in reverse directions.

A second object is to provide an improved transmission capable of driving an output shaft at a plurality of selected speeds in a single direction by means of an input shaft selectively drivable in reverse directions.

A third object is to provide an improved gear reduction, direction-responsive transmission capable of driving an output shaft at a lower or a higher speed in a single direction by means of an input shaft selectively drivable in reverse directions and without materially slowing the output shaft speed during the reversal of the input shaft.

Another object is to provide an improved combination of transmisison and coupling for driving an output shaft in a single direction, at either of two selected speeds, by means of a constant speed input shaft capable of turning in either direction.

A further object is to provide an improved washing machine drive mechanism pursuant to which the operation of the washing machine may be changed from washing to centrifugal extraction without material redistribution of the clothes contained within the machine.

In carrying out my invention I provide a transmission input shaft driven by an electric motor capable of reversal at high speed. The input shaft has a pinion gear journaled eccentrically on it. This pinion gear engages an internal gear and serves to drive the transmission output shaft through a suitable coupling. Clutch and brake means are provided to control the operation of the internal and pinion gears in response to the direction of rotation of the input shaft so that when the shaft is rotated in one direction, the internal gear is held in a stationary position by the brake means while the pinion gear and output shaft are rotated in an opposite direction at a reduced speed by the coaction of the pinion gear with the stationary internal gear; and so that when the input shaft is driven in the opposite direction, that is the direction in which the output shaft has been operating, the internal gear is released and the clutch means connects the pinion gear directly to the input shaft, whereby the output shaft is driven at the full speed of and in the same direction as the pinion gear and input shaft.

The features of my invention which I believe to be novel are set forth with particularity in the appended claims. My invention itself, however, may be best understood by reference to the following description taken in conjunction with the accompanying drawings in which:

Fig. 1 is an axial sectional view of my improved transmisison driving mechanism;

Fig. 2 is a view taken along line 2—2 of Fig. 1;

Fig. 3 is a view taken along line 3—3 of Fig. 1; and

Fig. 4 is a side elevational view, with parts broken away and in section, showing one form of automatic washing machine suitable for use with my invention.

Refering first to Fig. 4, there is shown a domestic washing machine including an outer cabinet 1 mounted on a suitable base structure 2. Access to the machine for the loading or unloading of clothes is provided by a door 3 mounted in the front wall of the cabinet. A backsplasher 4 mounted at the top of the cabinet serves as the mounting means for suitable operator controls for the machine, such as the rotatable dial 5.

The machine is of the type which includes a perforated clothes basket 6 rotatable about a non-vertical axis. As here shown, the basket is disposed for rotation about a generally horizontal axis and is mounted within an imperforate tub structure 7 which encloses it on all sides. The basket is rotatably supported from the tub structure by a horizontally extending shaft 8 mounted in an elongated bearing, not shown, located in the rear wall of the tub structure. The shaft, as well as supporting the basket, also serves as the means for turning it during the operation of the machine. The tub and basket are provided wtih openings in the front walls thereof, aligning with the opening of door 3 so that clothes may be placed in or removed from the basket. The door, moreover, seals against a gasket around the tub opening, all as known in the art, for the purpose of closing off the tub completely from the exterior during the operation of the machine.

The tub is supported from the base by means of a plurality of brackets or arms 10 which are mounted on upstanding plates 11 fixedly attached to base 2. During the operation of the machine the basket is driven from an electric motor 12 through my improved transmission 13, to the output shaft of which is attached pulley 14. A belt 15 engages between pulley 14 and a basket drive pulley 16 attached to shaft 8. As will later be described, the output shaft of the transmisison is capable of providing two speeds, depending upon the direction of rotation of electric motor 12. Accordingly one basket speed is available for tumbling the clothes in basket 6 during the washing or rinsing steps and a second basket speed is available for spin extraction following the washing or rinsing steps. In either event, however, the directions of rotation of the output shaft of the transmisison and of the basket 6 remain unchanged during the respective washing and spin extraction steps. Furthermore, since the direction of rotation of motor 12 is changed at a rapid rate, the basket 6 continues to rotate without a pause during the shifting of speed from the lower to the higher range and the clothes contained therein have no opportunity to shift position within the basket, due to the constant application of centrifugal force thereon. Merely as an example, the size of pulleys 16 and 14; the gear ratios within the transmisison; and the rated speed of motor 12 may be chosen to provide a speed of about 45 R. P. M. for the basket during the tumble-wash step and a speed of about 500 R. P. M. during the spin extraction step.

During the operation of the machine the various electrical components thereof are under the control of a suitable timer operated sequence control, not shown. Moreover, conventional means for introducing and removing water from the machine and for controlling the operation of any heating means within the machine, are provided and are under the influence of the sequence control, the precise nature of which forms no part of the present invention.

Reference now is made to Fig. 1 in which the reversible electric motor 12 is shown as housed within a casing 20 to which is axially attached a gear case 21. The motor drives shaft 22 which is journalled within the gear case by bearing 23 and which shaft serves as the input shaft of the improved transmission mechanism.

Adjacent its outer end the input shaft has keyed thereto the inner race 24 of a rolling contact bearing, such as a ball bearing. This bearing not only serves to journal a pinion gear 30 in an appropriate eccentric location, but also serves as an eccentric cam means for moving the pinion gear into rolling contact with a surrounding internal gear 40, later to be described. The key 25 joining the inner race to shaft 22 preferably serves also to join the notched plate 26 of a pinion gear roller clutch to the same shaft, as best shown in Fig.s 1 and 3. The plate 26 conveniently may be mounted in a plane parallel to the edge of the ball bearing races, and a pin 27 is provided to prevent the plate from being assembled backwards. The pin 27 is pressed into plate 26 and its protruding portion must align with a matching clearance hole in the inner race 24 in order for the plate 26 to be assembled correctly.

As a significant part of my invention the bore of the inner race 24 is formed eccentric to shaft 22 and is surrounded with an anular outer race 28 which, when mounted on the inner race, forms an eccentric hub for pinion gear 30. This gear is fitted upon the outer race and is provided with an elongated bushing having an inboard portion bearing the gear teeth and an outboard portion 31 to which is attached a radially extending drive disc or member 32 for a coupling means later to be described. The drive disc 32 may be of annular form contributing to compactness of the transmission and may be splined to the outboard portion 31 of the pinion gear bushing and held in place with a conventional snap ring. Interiorly of the outboard portion of the pinion gear bushing is located the pinion gear roller clutch including the notched plate 26.

As best shown in Fig. 3, the pinion gear clutch plate 26 is adapted to engage a series of rollers 33 when driven in one direction (for example, counter-clockwise as shown) and to lock said rollers against the outboard hub portion 31 of the pinion gear thereby to drive said gear counter clockwise. Conversely, when rotating clockwise as viewed in Fig. 3, the clutch plate 26 permits said rollers to roll freely without any locking engagement with the pinion gear.

Journalled within a bearing cavity in gear case 21, concentrically with respect to shaft 22, is an internal ring gear 40. The mounting of this gear is such that the teeth of the eccentrically mounted pinion gear most distant from the input shaft 22 are in mesh with the internal gear teeth while the teeth of the pinion gear nearest that shaft are out of mesh with the internal gear teeth (see Fig. 2). Rotation of the eccentric inner race 24, therefore, causes a rolling contact of the pinion gear along the internal gear. Specifically, the pinion gear rolls in the reverse direction with regard to the direction of rotation of the input shaft 22 and the cam-like race 24.

As an important part of my invention, the number of teeth provided in these respective meshing gears is such as to give a predetermined speed reduction to the pinion gear when shaft 22 rotates in one direction. In the usage illustrated, this speed is such as will be required for driving the washing machine basket during its washing or rinsing step. As an example, if shaft 22 rotates at 1800 R. P. M. and the pulleys 14 and 16 are designed to give a 3.5 to 1 speed reduction, then a speed of about 45 R. P. M. may be given to the washing machine basket 6 when the pinion gear embodies thirty-four teeth and the internal ring gear embodies thirty-seven teeth. Gears having this number of teeth provide a gear reduction ratio of twelve and one-third to one and that ratio coupled with the 3.5 to one pulley reduction gives the desired basket speed. The twelve and one-third to one ratio is produced since each revolution of the eccentric 24 causes the pinion 30 to counter rotate by three teeth.

For the purpose of insuring the necessary relative movement of the pinion gear with respect to the internal gear during this gear reduction phase of operation, a second one-way clutch means, best shown in Fig. 2, is provided for controlling the movement of the internal gear. Mounted within the gear case 21 is a plurality of spring pressed rollers 41 confined within recesses between the smooth outer annular, hardened periphery of the internal gear and the surface of hardened clutch blocks 42. When force is exerted tending to rotate the internal gear clockwise, as shown in Fig. 2, these rollers wedge between the stationary blocks and the periphery of the movable gear, thus holding the gear stationary. Conversely, when the force exerted tends to rotate the internal gear counter-clockwise, the rollers are permitted to roll freely and the internal gear then turns with respect to the gear case 21 in which it is journalled.

In order to transmit the motion of the pinion gear to an output shaft, a series of circumferentially spaced drive pins 50, carrying drive blocks 51 at the outboard end thereof, are attached to the drive disc 32 adjacent the periphey of the same. For simplicity of description only one such pin and block are shown. These blocks are adapted to engage within elongated slots 52 in a main floating coupling disc 53 and to rotate the coupling disc as the drive disc is rotated. When the pinion gear carrying the drive disc 32 is rotating in an eccentric orbit the drive blocks 51 reciprocate in slots 52 as they drive the coupling disc 53.

Completing the coupling is a driven disc 60 rigidly affixed to output shaft 61 and provided with a plurality of circumferentially spaced pins 62 carrying drive blocks 63 and attached to the driven disc adjacent the periphery thereof. For simplicity of description only one such pin and block are shown. Blocks 63 are adapted to reciprocate within elongated slots 64 in the main coupling disc whereby rotation of that main disc serves to drive disc 60. The main coupling disc 53 may conveniently be annular in shape, thus contributing to the compactness of my improved transmission mechanism, and is supported in a cradle-like mounting upon the plurality of slot engaging drive blocks 51 and 63. The main coupling disc, moreover, may be assembled in position by means of a cup-shaped spring 65 positioned upon output shaft 61 and pressing the main disc into close proximity to the edge of the pinion gear. Thus it is noted that power is transmitted relatively quietly from the driving disc 32 of the coupling to the driven disc 60. The entire transmission and coupling assembly is formed of reliable and simple components and may readily be housed in the gear case and operated with efficient lubrication. Moreover, it may easily be assembled or disassembled for servicing or for factory testing.

For compensating the unbalanced weight upon shaft 22, caused by the eccentricity of the pinion gear and drive disc 32, a counter weight assembly 73 of suitable form may be affixed to the input shaft 22 at an appropriate location. A suitable gear case cover 72 is provided to complete the housing of the transmission and coupling mechanism. Within this cover the output shaft 61 is journalled upon spaced bearings 70 and 71 and has attached to its outer end the pulley 14.

Assuming now that the controls of the washing machine are set for a washing or rinsing step requiring relatively low speed rotation of basket 6, the following operation of the transmission mechanism occurs. The input shaft 22 is driven at the rated speed of motor 12 in a clockwise or second direction as viewed in Figs. 2 and 3. Pinion gear clutch plate 26 turns clockwise at shaft speed and overruns freely with respect to the pinion gear outboard portion 31. The eccentric inner race 24 of the pinion gear supporting bearing moves clockwise at shaft speed. In its movement it cams the pinion gear, through the action of the outer race 28, into rolling contact with the internal gear 40. Due to the provision of a smaller number of teeth on the pinion gear than on the internal gear, the pinion gear rotates eccentrically in a counter-clockwise, or first, direction, and at a reduced speed. However, in rotating counter-clockwise the engagement of the pinion gear wth the internal gear imposes a clockwise torque or reaction force upon the internal gear. The tendency of the internal gear to rotate clockwise is restrained by reason of the wedging rollers 41 of the second one-way clutch means as these rollers press against the blocks 42 and the periphery of the internal gear.

As the pinion gear rotates counter-clockwise at its reduced speed, it carries driving disc 32 of the coupling with it in the same counter-clockwise direction. This rotation of the disc 32 drives the main coupling disc 53 through the pins 50 and the blocks 51. The movement of the drive pins 50 as they move with the pinion gear and the driving disc 32 is in an eccentric path, and accordingly the blocks 51 reciprocate within the slots 52 of the main coupling disc 53 as they drive it. The rotation of the main disc 53 in turn drives the driven disc 60 through the blocks 63 and the pins 62, the blocks 63 reciprocating as necessary in the slots 64. Power, therefore, is transmitted smoothly and relatively silently to the output shaft 61 which turns in a counter-clockwise direction at the reduced speed of the rotating pinion gear. This operation continues until the controls of the washing machine complete the low speed washing step and change to the high speed extraction step.

At this time, with output shaft 61 still turning in a counter-clockwise direction, the controls of the machine effect a rapid reversal of the direction of rotation of electric motor 12. This may be accomplished by operation of a conventional reversing switch (not shown) causing current to flow in the opposite direction through the motor starting oil, all as known in the art. It will be understood that in my preferred embodiment the motor rotates at the same speed in both directions. Upon this reversal of the direction of rotation of input shaft 22 to the counter-clockwise, or first, direction (as viewed in Figs. 2 and 3) the pinion gear clutch plate 26 tends to turn faster in a counter-clockwise direction than does the hub portion 31 of the pinion gear, which still is rotating counter-clockwise under the momentum of its previously acquired torque. Immediately the clutch rollers 33 are engaged against the hub portion 31 of the pinion gear 30, thus effectually locking the gear to shaft 22 and causing the pinion gear to turn counter-clockwise at that shaft speed.

This locking of the pinion gear to the input shaft thus nullifies the eccentric cam driving action formerly provided by the eccentric inner race 24 of the bearing, which likewise is locked or keyed to the same input shaft. Accordingly, pinion gear 30, clutch plate 26, races 24 and 28 and internal gear 40 now all turn counter-clockwise at the speed of input shaft 22. Eccentric motion of the pinion gear 30 with respect to the main coupling disc 53 is also terminated at this time and blocks 51, therefore, do not slide within slots 52 as they drive disc 53. Accordingly, the main disc 53 rotates counter-clockwise as before but at the same speed as input shaft 22 and through the connection to driven disc 60 thus drives output shaft 61 as before, but at the speed of the input shaft. It will be apparent that upon the thus described locking of the pinion gear assembly to the internal gear 40 the internal gear is free to rotate in the counter-clockwise direction since the rollers 41 of the internal gear clutch means no longer are forced between the periphery of the gear and the clutch blocks 42.

By this invention it is thus possible to continue the rotation of the output shaft 61 and, through the intermediary pulley drive, the rotation of the basket 6 of the washing machine in the same direction and without a pause when the washing or rinsing steps are terminated and the spin extraction step is initiated. This prevents the clothes from collecting at a single point within the basket as the change from the one speed to the other is made, and the possibility of undesirable vibration occurring during the washing cycle, is, therefore, greatly reduced, if not substantially eliminated.

As used herein the terms, first and second directions, as synonymous for counter-clockwise and clockwise motion, respectively, are solely for purposes of clarity and not as a limitation. Merely by reversing the locking action of both one-way clutches the structure would operate equally well in reversed directions.

While I have shown a particular embodiment of my invention, it will be understood, of course, that I do not wish to be limited thereto, since many modifications may be made; and I, therefore, contemplate by the appended claims to cover any such modifications as fall within the true spirit and scope of my invention.

What I claim as new and desire to secure by Letters Patent of the United States is:

1. In a power transmission, an input shaft rotatable in either direction at a substantially constant speed, an output shaft, and means for rotating said output shaft continuously in the same direction at two different speeds by the rotation of said input shaft in the first and second opposite directions, said means comprising an internal gear, a pinion gear meshing with said internal gear, a driving connection between said pinion gear and said output shaft for imparting to said output shaft the speed and direction of rotation of said pinion gear, a brake means for preventing rotation of said internal gear in said second direction, means including said internal gear for rotating said pinion gear from and eccentrically to said input shaft and in said first direction when said shaft is rotating in said second direction, said pinion gear and said internal gear having a gear ratio whereby said pinion gear is driven in said first direction at a reduced speed with respect to the speed of said input shaft, a uni-directional clutch means operated by said input shaft when operated in said first direction for driving said pinion gear in said first direction at the speed of said shaft, and said first clutch means upon rotation of said input shaft in said direction operating to free said internal gear to rotate with and at the speed of said pinion gear in said first direction.

2. A directional responsive two-speed transmission including an input shaft, an output shaft, a pinion gear, means coupling said pinion gear to said output shaft, a clutch means for selectively connecting said pinion gear to said input shaft when said shaft is rotating in a first direction thereby to drive said gear in said first direction at input shaft speed, an internal gear meshing with said pinion gear and turning with said gear in said first direction, a brake means engaging said internal gear and permitting rotation thereof only in said first direction, and an eccentric means attached to said input shaft for causing said pinion gear to effect rolling engagement with said internal gear during the rotation of said input shaft in the opposite direction whereby said pinion gear is driven in said first direction at a speed lower than input shaft speed when said input shaft is rotating in said opposite direction.

3. The combination of claim 2 wherein the means coupling said pinion gear to said output shaft includes a driven member attached to said output shaft, a driving member attached to said pinion gear, and means connecting said driving and driven members and permitting radial movement of said members relative to each other.

4. A direction responsive two-speed transmission comprising an input shaft, an output shaft, means for driving said input shaft selectively in the first and second opposite directions at a constant speed, a pinion gear, hub means journalling said pinion gear eccentrically on said input shaft, an internal gear rotatably mounted and arranged to mesh with said pinion gear, said internal gear being mounted concentrically with respect to said input shaft and having a greater number of gear teeth than the number of pinion gear teeth, a brake means for permitting rotation of said internal gear in said first direction only, means including said hub means and said internal gear for rotating said pinion gear in said first direction at a first speed lower than input shaft speed when said input shaft is rotating in said second direction, said internal gear being then held stationary by said brake means, a clutch means selectively engaging said pinion gear and said input shaft for rotating said pinion gear and said internal gear together in said first direction at shaft speed when said input shaft is rotating in said first direction, and means coupling said pinion gear to said output shaft thereby to transmit power to said output shaft at either of the two speeds of said pinion gear.

5. The combination of claim 4 wherein the means coupling said pinion gear to said output shaft comprises a first annular disc attached to said pinion gear and serving as a coupling drive member, a second annular disc attached to said output shaft and serving as a coupling driven member, a third annular disc connected intermediate first and second discs and serving as a connecting means therebetween, and means including drive pins and radially movable members connecting said third disc to said first and second discs respectively.

6. The combination of claim 4 wherein said hub means comprises the eccentric inner race of a rolling contact bearing, and said clutch means includes a clutch plate driven by said input shaft and a plurality of rollers between said clutch plate and the inner surface of pinion gear.

7. In an automatic washing machine having a rotatable basket, means for driving said basket in a single direction at either of two selected speeds and comprising a reversible electric motor, a direction responsive two-speed transmission including an input shaft driven by said motor, an output shaft connected to said basket, a pinion gear, means coupling said pinion gear to said output shaft, a clutch for selectively connecting said pinion gear to said input shaft when said shaft is rotating in a first direction thereby to drive said gear in said first direction at input shaft speed, a rotatably mounted internal gear meshing with said pinion gear, a brake means engaging said internal gear and permitting rotation thereof only in said first direction, and an eccentric means attached to said input shaft for causing said pinion gear to effect rolling engagement with said internal gear during the rotation of said input shaft in the second opposite direction whereby said pinion gear is driven in said first direction at a speed lower than input shaft speed while said input shaft is rotating in said second direction.

8. In an automatic washing machine having a rotatable basket, means for driving said basket in a single direction at either of two selected speeds and comprising a reversible electric motor, a direction-responsive two-speed transmission including an input shaft driven by said motor, an output shaft connected to said basket, a pinion gear mounted eccentrically with respect to said input shaft, means coupling said pinion gear to said output shaft, a clutch for selectively connecting said pinion gear to said input shaft when said shaft is rotating in a first direction thereby to drive said gear in said first direction at input shaft speed, a rotatably mounted internal gear meshing with said pinion gear, said internal gear being mounted concentrically with respect to said input shaft and having a greater number of gear teeth than the number of pinion gear teeth, a brake means engaging said internal gear and permitting rotation thereof only in said first direction, and an eccentric means attached to said input shaft for causing said pinion gear to effect rolling engagement with said internal gear during the rotation of said input shaft in the second opposite direction whereby said pinion gear is driven in said first direction at a speed lower than input shaft speed while said input shaft is rotating in second direction.

References Cited in the file of this patent

UNITED STATES PATENTS

| | | |
|---|---|---|
| 1,144,092 | Apple | June 22, 1915 |
| 1,590,166 | Howard | June 22, 1926 |
| 2,467,627 | Olson | Apr. 19, 1949 |

UNITED STATES PATENT OFFICE
CERTIFICATE OF CORRECTION

Patent No. 2,851,909 — September 16, 1958

Carl S. Dayton

It is hereby certified that error appears in the printed specification of the above numbered patent requiring correction and that the said Letters Patent should read as corrected below.

Column 6, line 67, after "said" strike out "first"; line 68, after "said", first occurrence, insert -- first --; column 7, line 49, for "connected" read -- mounted --.

Signed and sealed this 9th day of December 1958.

(SEAL)
Attest:

KARL H. AXLINE
Attesting Officer

ROBERT C. WATSON
Commissioner of Patents